Figure 1:
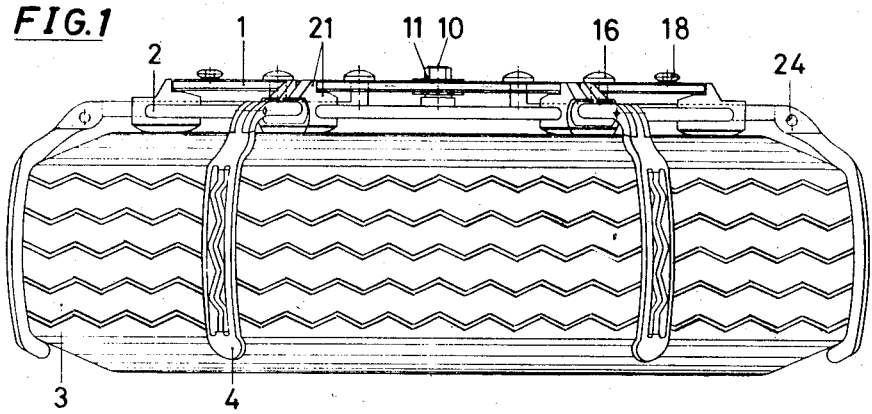

United States Patent [19]

Gomez

[11] 3,847,196
[45] Nov. 12, 1974

[54] AN ICE AND SNOW ANTI-SLIDING DEVICE, APPLICABLE TO WHEELS OF VEHICLES

[76] Inventor: Teodosio Diaz Gomez, Paseo de Perez Galdos 14, Santander, Spain

[22] Filed: Dec. 19, 1972

[21] Appl. No.: 316,482

[30] Foreign Application Priority Data
Dec. 20, 1971  Spain .................................. 175543
Sept. 9, 1972  Spain .................................. 183742

[52] U.S. Cl. ............................. 152/226, 152/219
[51] Int. Cl. ......................................... B60c 27/04
[58] Field of Search .......... 152/226, 225, 217, 218, 152/219

[56] References Cited
UNITED STATES PATENTS
2,575,263  11/1951  Eisenhauer, Sr. .................... 152/225
2,910,105  10/1959  Binegar .............................. 152/225
3,753,456  8/1973  Saunders ........................... 152/225

Primary Examiner—James B. Marbert
Attorney, Agent, or Firm—Lane, Aitken, Dunner & Ziems

[57] ABSTRACT

An anti-skid apparatus applied to the wheels of vehicles, especially automobiles, for use in snow and ice including a series of anti-skid elements in the form of articulated arms having an arched section abutting the tire tread surface and a straight section provided with a king pin. The straight section of each of the anti-skid elements is slidably mounted through a series of guides supported on a peripheral ring concentric with a central tightening disc. The central tightening disc is provided with a series of slots having eccentric and radially prolonged portions within which the king pin slides. When the device is mounted a tire, and the disc is rotated relative to the ring the king pin faces the radially elongated portion of the slots thereby permitting radial oscillation of the anti-skid elements to accommodate for deflection of the tire.

8 Claims, 10 Drawing Figures

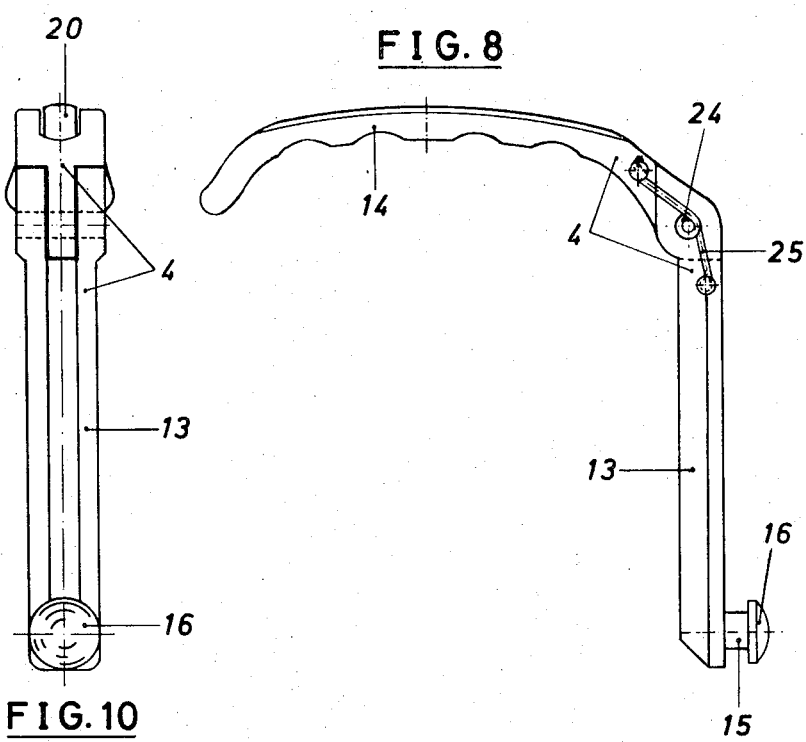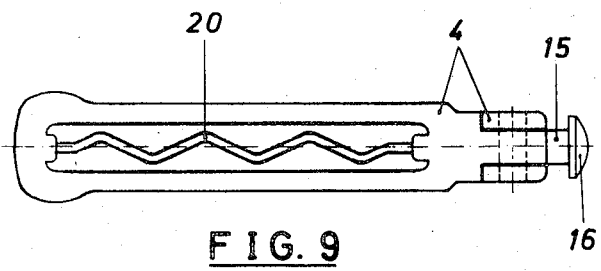

AN ICE AND SNOW ANTI-SLIDING DEVICE, APPLICABLE TO WHEELS OF VEHICLES

The present invention is concerned with an anti-skid apparatus applied to the wheels of vehicles, especially automobiles, for use in snow and ice, and on other analogous surfaces, of extremely simple structure and assembly, which adapts itself to the deflection of the tyre and ensures a good grip on any slippery surface, allowing a satisfactory speed to be maintained.

At present, when vehicles have to run over roads affected by snow and/or ice, they have no other method of solving the problem of skidding except to apply to the wheels the traditional chains provided with transverse sections, the use of which presents well known difficulties. Reference is also made to other known anti-skid systems which can also be superseded by the new system which is the object of this invention.

As has been said, the anti-skid apparatus which is the object of the present invention avoids the known difficulties mentioned above owing to the extremely easy method of application, since it is not necessary even to raise the wheel, to remove it, or to perform other more or less complicated operations, because it can be put in place and removed in seconds, as well as allowing the vehicle to progress at a satisfactory speed owing to its system of suspension and good adherence.

The anti-skid apparatus which is the object of the invention comprises three components or subassemblies: first a central tightening disc, second a peripheral ring independent of the disc; and third a series of cranked arms which constitute the anti-skidding elements.

These components or subassemblies are independent of each other but are coupled and related so that they form an assembly which can be applied laterally to the wheels.

The central tightening disc is provided with a series of eccentric slots of equal form, which incline from a larger to a smaller diameter and which are prolonged radially towards the interior of the disc, starting from the end nearest to the centre of said disc and terminating in an enlargement.

The point where the oblique and radial sections of these slots meet, remains closed in synchronisation with the circular movement of the disc with the object of preventing the passage of the king pin of the arm to the oblique section when this arm is displaced by following the deflection of the tyre or through the effect of traction. The king pin thus slides through and over the locking piece, the remainder of the disc not being affected by its friction.

The slots can be straight or arched, open or closed, or one or two rails, it being possible to vary both the distance between them and that at the centre of the disc, so that the apparatus possesses a greater margin for application to wheels of different diameters and also so that in certain cases it can be easily attached.

The peripheral ring situated around the disc is concentric with it and of smaller diameter than the wheel. This ring is provided with a series of radially disposed support-guides, equal in number to the slots in use on the disc.

Finally the arms are cranked and articulated, the straight part being intended to be mounted with the capacity of sliding radially in the guides of the ring, whilst the other section of the arms is arched, developing a maximum opening of 90° between both parts, this section being coupled to the tread of the wheel and this second part constituting the gripping anti-skid element.

The straight sections which are coupled to the guides of the ring are provided at one end with a king pin perpendicular to such section, fixed or moveable, intended to be connected to the eccentric slots of the disc.

In this way the three elements, disc, ring and arms are connected together so that the whole apparatus can be attached to the wheel when the king pin is at the end of the slots furthest away from the centre of the disc, in which condition the arched sections of the arms are in their most external position. Once this attachment is achieved, the central disc is rotated until the said king pin is at the end of the eccentric slots nearest to the centre of said disc by which time the straight section of the cranked arms will have moved radially towards the interior, and consequently the arched section approaches the tread and remains firmly attached over said tread. In this position the king pins also remain facing the radial prolongation of the slots so as to permit their radial oscillation together with the arms, following the deflection of the tyre.

The length of the eccentric slots is such that the king pin remains facing the radial prolongation of said slots when the arched section of the arms is in intimate contact with the tread whilst when the king pin is at the opposite end of the slot, said arched section is separated from the tread, permitting the assembly or removal of the apparatus.

The rotation of the central disc can be achieved manually by direct operation of said disc or by means of a gear, this central disc being provided with a toothed section in its periphery, whilst the ring is provided with a pinion which engages with said sector. In this manner, rotation of the pinion effects the rotation of the disc and consequently the action of the slots, thus achieving the approach or withdrawal of the cranked arms from the tread. The manual operation of the disc nevertheless is, at the same time, suitable to be provided with any pinion which is not endless.

The king pin of the arms in the present case is provided at its free end with a head of greater dimension than the width of the eccentric slot and the radial prolongation of said slot, but less than the enlargement in which said radial prolongation ends. In this way it is prevented from coming out in any position of the travel of the slots, but can be extracted through the said enlargement.

In the present case also, the guides of the ring are open to allow the passage of the arms with their king pins, so that the three elements or principal pieces can be assembled or dismantled.

Equally, the arched section of the cranked arms can be constructed so that the central portion which comprises the anti-skid element may be exchangeable with the object that such portion and the rest of the cranked arm can be made of different materials to achieve the best result.

Figure 2:
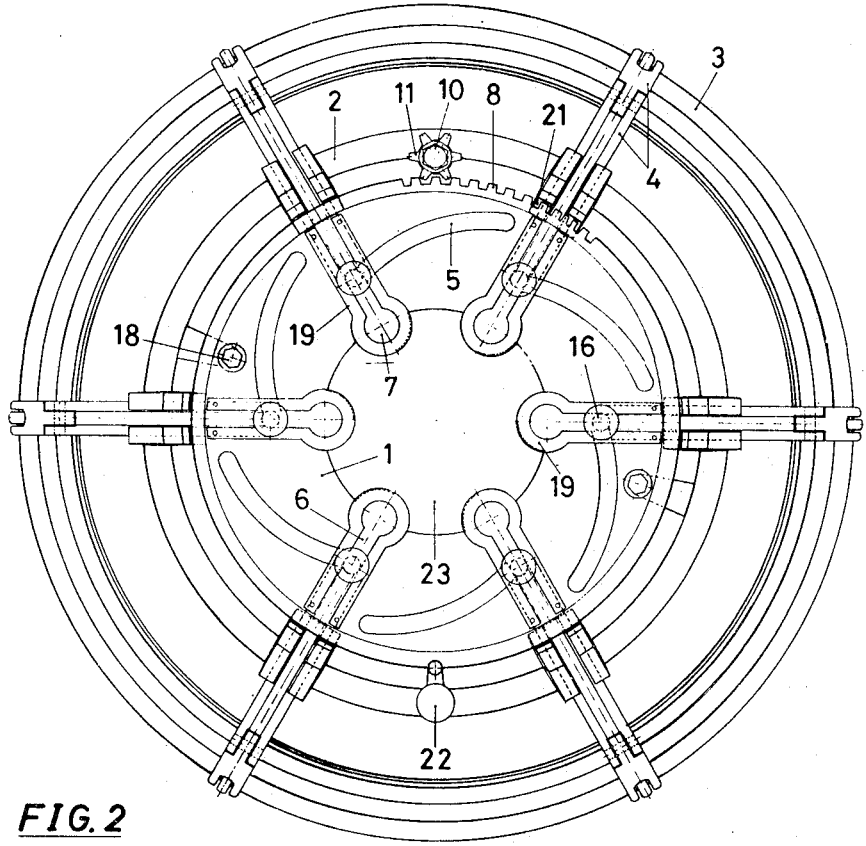
Figure 3:
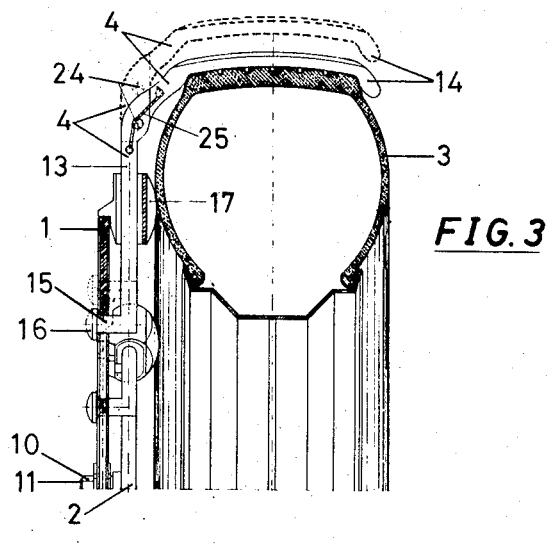
Figure 4:
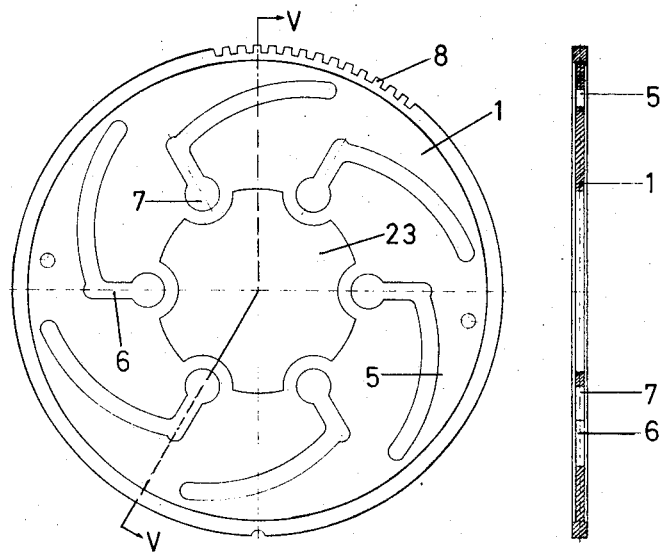
Figure 5:
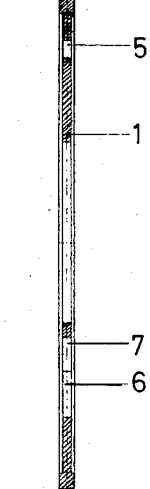
Figure 6:
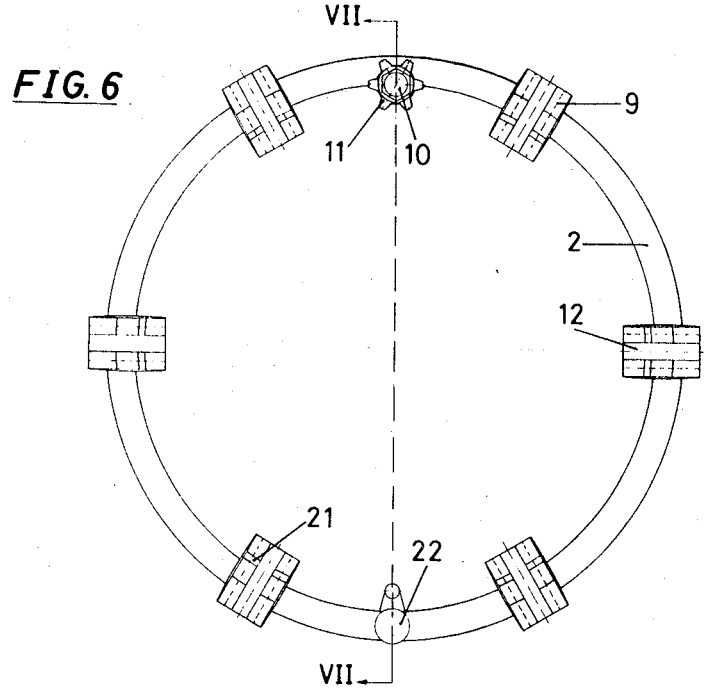
Figure 7:
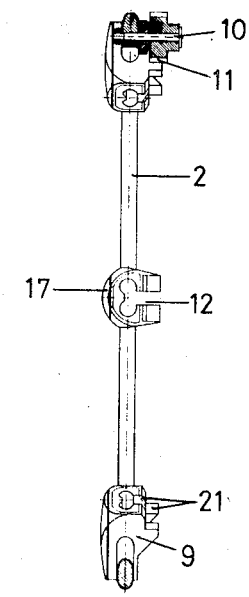

All the characteristics described above, as well as the construction and functioning of the apparatus, will be more easily understood with the aid of the following description in which reference is made to the accompanying drawings and which shows an embodiment of the invention, by way of example only, and in which, FIG. 1 is a front view of the apparatus mounted on a wheel, FIG. 2 is a lateral view of the same apparatus, FIG. 3 is a section of half a wheel with the apparatus of the invention mounted on it, FIG. 4 is a front view of the central disc, FIG. 5 is a section on line "V — V" of FIG. 4, FIG. 6 is a front view of the peripheral ring, FIG. 7 is a section on line "VII — VII" of FIG. 6, FIG. 8 is a side elevation of one of the articulated cranked arms, FIG. 9 is a plan view of the arms, FIG. 10 is a side elevation of said arms.

As can be seen from the drawings, FIGS. 1, 2 and 3, the anti-skid apparatus includes a central disc (1), an independent peripheral ring (2) concentric with said disc and of smaller diameter than the wheel (3), and a series of cranked arms (4), such elements being arranged so that they can be attached laterally to the wheel (3).

As is shown in FIGS. 4 and 5, the central disc (1) is provided with a series of slots having an eccentric portion (5), of slightly arched form in the example described, and a radially prolonged portion (6) starting at the end nearest to the centre of said disc (6), terminating with an enlargement (7). The central part of the disc (23), or others, may be closed or open with the object of lessening their weight, as is shown in FIG. 4. Said disc is provided on its periphery with a toothed sector (8).

The ring (2) shown in FIGS. 6 and 7 is provided with a series of support guides (9), of equal number to the slots (5) which are in use on the disc (1). The ring (2) is also provided with a support (10) in which is mounted a pinion or spindle (11) intended to engage with the toothed sector (8) of the disc (1). In order to equalise the weight of this device on the wheel, there is provided at the diametrically opposite point (22) an equivalent mass as a counterweight. The support guides (9) are shown laterally open, in their front parts by means of a radial groove (12). (18) is a device for manual rotation of the disc and locking of the apparatus.

The arms (4) shown in FIGS. 8, 9 and 10 are of cranked form and have one straight section (13) and another slightly arched section (14). The section (13) is approximately equal in section to the interior of the guides (9) of the ring (2), so that the arms (4) can be coupled in the guides of the ring, allowing the section (13) to slide. The straight section (13) is also provided at one end with a king pin (15) finished by a head (16) and at the other the articulated joint (24) with the arched section (14). The part (20) is the interior portion of the section (14).

The king pin (15) is mounted on the slots (5) of the central disc (1). The head (16) of the king pins (15) is of greater dimension than the width of the slot (5) and prolongation (6), but less than that of the enlargement (7) for the removal or assembly of the arms in the disc (1). The longitudinal opening (12) of the guides (9) also allows the passage of the king pin (15) through them so that the arms (4) can be removed and assembled in the guides (9) at will.

Said guides can also be closed so that, nevertheless, they allow the passage of the arm with its king pin.

The guides (9) are also provided on the same front side as the opening (12), with bearing surfaces (21) which guide the disc (1) frontally and radially in order to centre it when it is rotated, and at the same time also serve as a support for the force which the arms and disc have to exert whilst working; and on the opposite side to the opening (12) there is provided a bulge (17) which as can be seen in FIG. 3 serves as a support element over the lateral of the wheel (3). The spring (25) is intended to keep open the arched part of the cranked wheel, to facilitate the placing of the apparatus on the wheel. (18) is a device for manual rotation of the disc and locking of the apparatus.

With the construction described, the cranked arms (4) are mounted in the guides (9) of the ring (2), introducing the head (16) of the king pins (15) through the enlargements (7). Then the disc (1) is rotated so that the king pins remain at the end of the slots (5) furthest away from the centre of said disc, and so that the arms are radially displaced towards the outside, the arched section (14) remaining separated from the tread of the wheel (3). In this position the apparatus can be coupled laterally over the wheel, then the disc (1) is rotated in an opposite direction, so that the king pins (15) tend to be situated at the end of the slots (5) nearest the centre of said disc, the position shown in FIGS. 2 and 3. During this rotation, the external edge of the slots (5) has acted as a cam displacing the arms (4) towards the inside until the arched part (14) of these is firmly attached over the tread, as shown in FIGS. 1, 2 and 3, thus ensuring that the anti-skid apparatus is firmly fixed to the wheel.

The length and location of the slots (5) are such that when the king pin is at the end of the slots furthest away from the centre of the disc, the arched section (14) of the cranked arms is separated from the tread of the wheels so as to permit the removal or application of the apparatus, whilst when said king pin (15) is at the end of the slots (5) nearest to the centre of said disc, the section (14) is firmly pressed over the tread.

Also, in this last position, the king pin (15) is opposite the prolongation (6) of the slots (5) which are closed between the radial section and the oblique section by a fastener (19) or closure carried by the disc and fixedly secured for rotation therewith. The radial prolongation (6) thus permits radial oscillation of the arms (4) and their king pins (15), the latter sliding through and over the said fastener whilst the arms follow the deflection of the tyre, which will operate on their straight part, their arched part, or both at the same time.

As has already been indicated, the apparatus mounted on the wheels can be supported laterally on them or not, either on the edge of the rim or on the tyre or on both parts by means of the prominences (17) adequately disposed on the guides (9) the ring (2).

The rotation of the central disc (1), in one direction or the other, can be achieved manually by means of (18) this device serving at the same time as a means of anchorage of the apparatus, or acting through the gearing system (11). Rotation of the gear of the ring, will act upon the teeth of the disc and make this rotate, radially displacing the arms. The gear (11) can be straight, helical, endless, or any other of these systems suitable for achieving its purpose in the most efficient way.

In FIG. 3 the position of the arms (4) is shown with a continuous line when they are coupled over the tyres and with a broken line when they are separated from the tyres because the king pin (15) is at the end of the slot (5) furthest away from the centre of the disc.

The function of the section (14) is to adhere to the wheel and its part (20), which constitutes the anti-skid element, can be arranged in a form which is exchangeable so that it can be replaced when it wears out, or vary its form or the type of material, depending upon the type of slippery surface over which the vehicle has to run.

In order to dismantle the apparatus the action used for assembly is reversed, rotating the central disc (1) in the opposite direction so that the king pin (15) is situated at the end of the slots (5) furthest away from the centre of the disc, thus ensuring that the arched section (14) of the arms (4) is separated from the tread of the wheel.

In order to dismantle it or assemble it, it is sufficient to make the head (16) of the king pins arrive at the enlargement (7) the central disc (1) being able to be extracted. Next, the arms (4) are slid along the guides (9) until the king pin (15) passes along the groove (12), thus leaving the pieces separate or loose.

I claim:

1. Anti-skid apparatus for use in snow and ice, applicable to vehicle wheels, comprising:
    a disc provided with a series of slots having an eccentric portion which inclines from a larger to a smaller diameter, and a radially prolonged portion extending towards the center of the disc and terminating in an enlargement, the whole comprising a single piece;
    an independent peripheral ring, concentric with the disc, and of smaller diameter than the wheel;
    a series of radially disposed guides supported on said peripheral ring equal in number to the number of slots in use on said disc;
    a series of cranked arms, equal in number to the guides, having a straight section and an arched section, the straight section being mounted so that it slides radially in the guides of the ring and having at one end a king pin slidably disposed in said slots, said arched section of the arm being joined at the opposite end of said straight section, in order to be coupled over the tread of the wheel, and constituting the anti-skid element, and both the straight and arched sections, being joined in an articulated manner; and
    means for rotating said disc relative to said ring whereby said cranked arms are displaced radially.

2. Apparatus according to claim 1, wherein said eccentric portion of said slots are of such length and location that when the disc is rotated in one direction, and through its connection with the king pin of the cranked arm, it radially displaces the cranked arm until the arched section contacts the tread of the wheel and the king pin faces the radially prolonged portion of said slot, whilst by rotation of said disc in the opposite direction, the removal of the apparatus can be effected and said radially prolonged portion of said slots being of such length as to permit longitudinal oscillation of the cranked arms following deflection of the tire; and a closure carried by said disc at said radial prolongation of said slots fixedly secured for rotation with said disc serving to interrupt the passage of the king pin from the radially prolonged portion of said slot to the eccentric portion of said slot when the arched section of said cranked arm contacts the tread of the wheel.

3. Apparatus according to claim 1, wherein said means for rotating said disc relative to said ring comprises a toothed sector, disposed along the periphery of said disc; and a gear supported on said ring engaging said toothed sector, to achieve the partial rotation of said disc in relation to the ring, the action of said gear thus radially displacing the arms.

4. Apparatus according to claim 1, wherein said radially disposed guides have bearing surfaces on their frontal part in order to center, support and fasten the disc.

5. Apparatus according to claim 1, wherein said straight section of said cranked arms is attached to said arched section at the end opposite from said king pin by an articulated joint having a maximum opening of 90°; and a spring connected to said straight section and to said arched section serving to maintain an angle of 90° between said straight and said arched sections.

6. An anti-skid apparatus for use in snow and ice, applicable to vehicle tires, comprising:
    a disc;
    an independent peripheral ring concentric with said disc and of smaller diameter than said tires;
    a series of radially disposed guides supported on said ring;
    a series of cranked arms, each having a straight section and an arched section, said staight section being mounted so as to slide radially within said guides; and
    means carried by said disc and engagable with said straight section of said cranked arms for causing radial movement of said cranked arms upon rotation of said disc relative to said peripheral ring so that said arched section abuts the tread of the tire and permitting radial oscillation of said cranked arm relative to said disc to accommodate deflection of said tire.

7. The apparatus as defined in claim 6 wherein said means carried by said disc comprises said disc having formed therein a series of slots having an eccentric portion inclined from a larger to a smaller diameter and a radial portion prolonged towards the center of said disc; and wherein said cranked arm further includes a king pin disposed on the end of said straight section opposite said arched section and disposed within said slot; and
    a closure secured to said disc to retain said king pin within said elongated radial portion of said slot when the apparatus is mounted on said tire.

8. The apparatus as defined in claim 7 wherein said disc further includes a toothed section formed along the peripheral surface thereof; and said ring further includes a gear in operative relationship with said toothed section for rotating said disc relative to said ring; and wherein said cranked arms further include a spring connected to said straight section and to said arched section for maintaining an angle of 90° between said straight and said arched sections.

* * * * *